Patented Jan. 8, 1924.

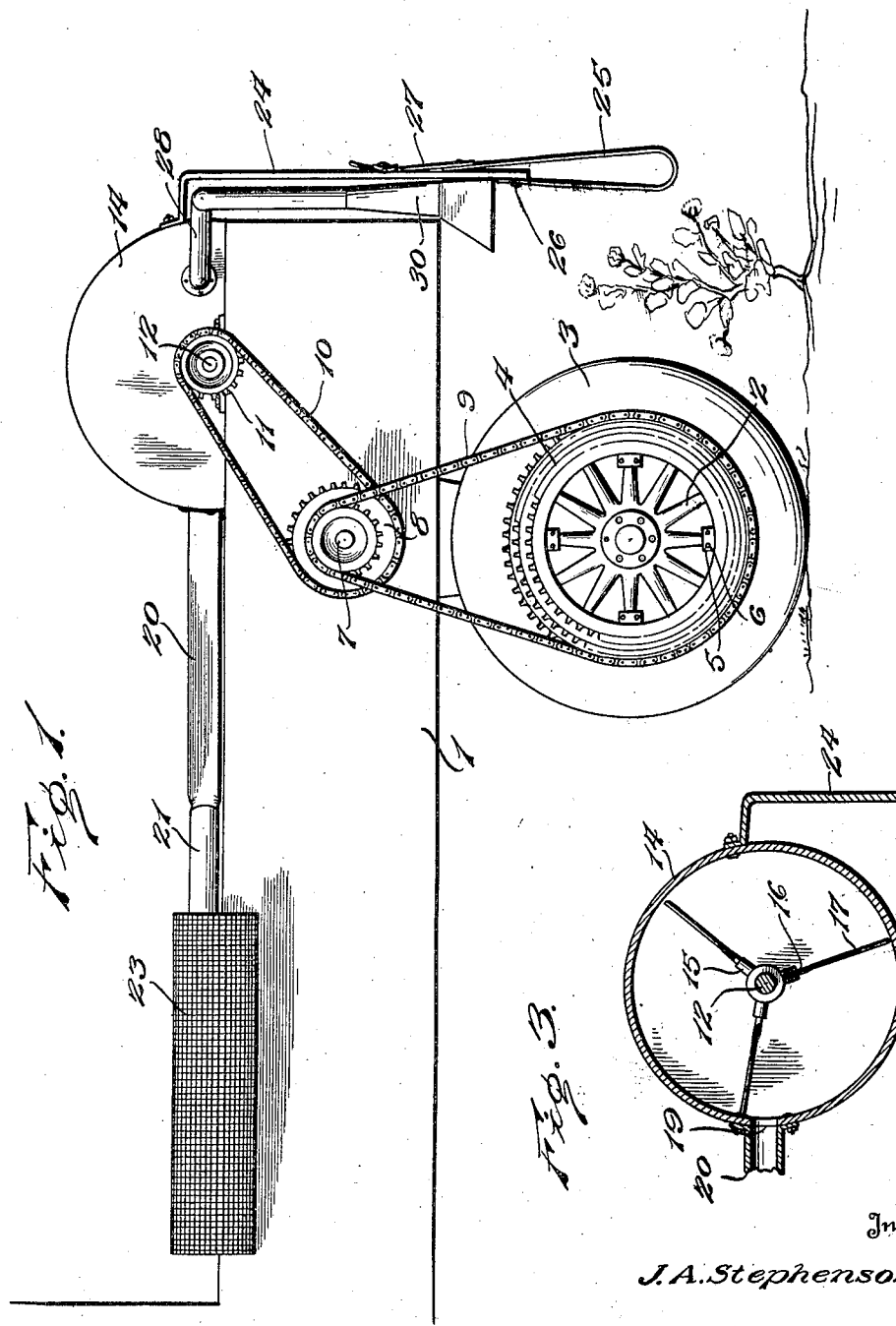

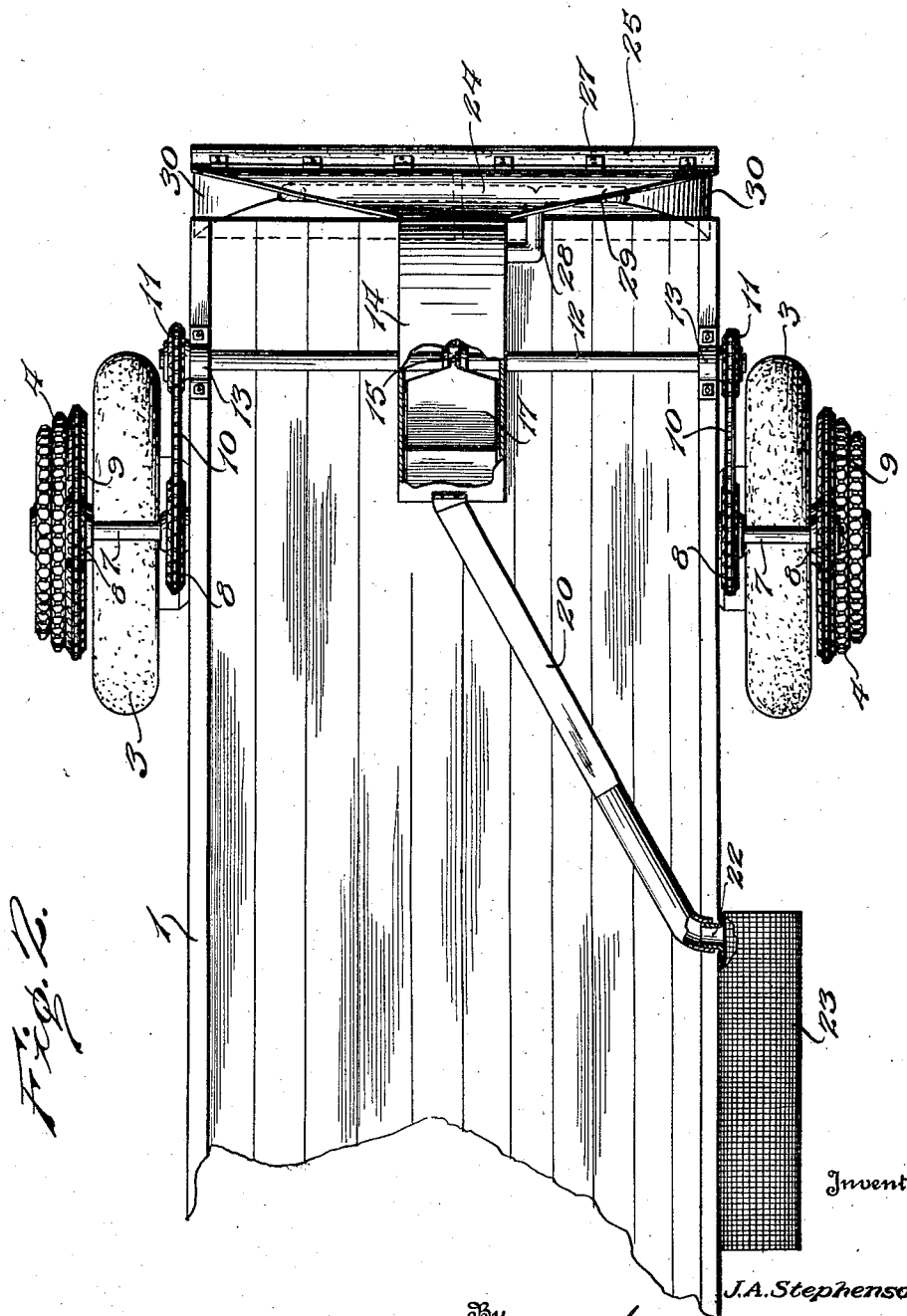

1,480,123

UNITED STATES PATENT OFFICE.

JOHN A. STEPHENSON, OF BLANCHARD, OKLAHOMA.

BOLL-WEEVIL DESTROYER.

Application filed March 14, 1923. Serial No. 625,040.

*To all whom it may concern:*

Be it known that I, JOHN A. STEPHENSON, a citizen of the United States, residing at Blanchard, in the county of McClain and State of Oklahoma, have invented certain new and useful Improvements in Boll-Weevil Destroyers, of which the following is a specification.

This invention relates to means for destroying boll weevils and has for its object the provision of a simple mechanism which may be readily mounted upon a wagon or truck and operated by the wheels of the same to create a suction whereby the insects and imperfect bolls will be drawn from the plants and delivered into receptacles for subsequent destruction. The invention also has for its object the provision of means for agitating or beating the plants as the vehicle is drawn along the row whereby the insects and imperfect bolls will be loosened and may be very readily detached.

The invention is illustrated in the accompanying drawings, in which—

Figure 1 is a side elevation of a portion of a truck having my improvements mounted thereon;

Fig. 2 is a plan view of the same, and

Fig. 3 is a detail section through the drum.

In the drawings, the reference numeral 1 indicates a truck or wagon which may be of any desired form. To the spokes 2 of the rear truck wheels 3, I secure multiple sprocket gears 4, the said gears being constructed with sockets or collars 5 adapted to fit against the said spokes and receive the ends of the clip bolts 6 fitted around the spokes and inserted through the sockets, as will be readily understood. A stub shaft 7 is mounted upon the side of the truck body, and sprocket gears 8 are mounted upon the said shaft, a sprocket chain 9 being trained around one member of the sprocket 8 and around the proper member of the sprocket 4 whereby any desired speed may be imparted to the sprocket 8. A second sprocket chain 10 is trained around the sprocket 8 and around a sprocket 11 fixed on the end of the fan shaft 12 which is mounted in suitable bearings, indicated at 13, upon the wagon body and extends through a drum or cylindrical casing 14 supported rigidly in any convenient manner upon the body at the rear end thereof, as shown. Within the drum or casing 14, the shaft 12 is provided with radial sockets 15 in which are threaded the stems 16 of beater or fan blades 17, and it will be readily understood that, as the vehicle is drawn along the row of plants, the described gearing with effect rotation of the shaft 12 and the fan blades carried thereby so that the said blades will rotate at a high speed to create a suction through the drum, the drum being provided with an inlet in its side at its rear and provided in its front side with an outlet. Mounted upon the wagon body in advance of the drum and abutting the same in air-tight relation is a discharge tube 20 which, as shown most clearly in Fig. 2, extends forwardly toward the side of the wagon body where it is coupled to a nozzle 22 forming the inlet for a basket or receptacle 23. The receptacle 23 is preferably constructed of wire netting so that, after it has been filled, it may be immersed in some poisonous liquid whereby the insects accumulated therein will be destroyed. Secured to the rear side of the drum 14 and depending therefrom in spaced relation to the same and to the end of the wagon body is a covering plate 24 which is preferably of metal so as to possess the requisite durability. Carried by the lower portion of this cover is an apron or beater 25 which may be of any flexible material, such as canvas, and has one edge secured to the front face of the cover 24 by buttons or headed studs 26, the opposite edge of the beater apron being connected with the outer side of the cover plate by straps 27 so that the cover may be set to depend below the lower edge of the plate to any desired degree. As shown most clearly in Fig. 1, the beater apron is folded or doubled upon itself so that it constitutes a loose flexible member which is adapted to impinge against the plants as the vehicle is driven along the row of plants so that the insects and imperfect bolls on the plants will be loosened without injury to the plants and will then be readily taken up by the suction created by the fan blades 17.

The suction pipe 28 extends from the inlet of the drum or fan casing below the cover plate 24 and branched so as to lie transversely in rear of the wagon body, as shown at 29. The pipe terminates in vertically disposed flared section nozzles 30 having their mouths arranged adjacent the beater apron 25 whereby the loosened insects will be at once drawn through the suction pipe and the fan casing and driven out through the discharge tube 20.

It will be readily understood that the machine is to be driven along a row of plants before the plants have attained any considerable growth, the wheels of the vehicle passing at the sides of the row and the body of the vehicle passing over the plants in the row. The rotation of the wheels will be transmitted through the gearing shown and described to the fan shaft 12 and a suction will consequently be created through the nozzles 30 between the body of the vehicle and the plate 24 thence through the drum and the chambers 20 so that the insects will be sucked from the plants into and through the drum and driven through the tube 20 into the receptacle 23. When the receptacle 23 is filled, it may be easily withdrawn from the front end of the tube and then dipped in any insect-destroying compound in an obvious manner. My mechanism is simple and compact and may be readily mounted upon any vehicle.

Having thus described the invention, what is claimed as new is:

1. A mechanism for the purpose set forth comprising a drum adapted to be secured upon a vehicle body, a fan within the drum, means for driving the fan from the wheels of the vehicle, a plate secured to the rear side of the drum above the inlet thereof and depending from the drum in spaced relation to said inlet, a receptacle disposed in front of the drum and connected with the outlet of the drum, and a beater carried by the said plate.

2. A mechanism for the purpose set forth comprising a drum adapted to be secured upon a vehicle body, a fan within the drum, means for rotating the fan from the wheels of the vehicle, a plate secured to the rear side of the drum above the inlet of the same and depending therefrom in spaced relation thereto, a beater apron having one edge secured to the lower end of the said plate and its opposite edge adjustably secured to the said plate, and a receptacle connected with the outlet side of the drum.

In testimony whereof I affix my signature.

JOHN A. STEPHENSON. [L. S.]